United States Patent [19]
Langenstein

[11] 4,335,568
[45] Jun. 22, 1982

[54] FILAMENT-TYPE VEGETATION TRIMMER WITH AUTOMATIC LINE SENSOR

[75] Inventor: Max Langenstein, Illertissen, Fed. Rep. of Germany

[73] Assignee: Max Langenstein Feld- und Gartengeräte GmbH & Co., Illertissen, Fed. Rep. of Germany

[21] Appl. No.: 288,398

[22] Filed: Jul. 30, 1981

[30] Foreign Application Priority Data

Jul. 31, 1980 [DE] Fed. Rep. of Germany ....... 3029056

[51] Int. Cl.³ .............................................. A01D 55/30
[52] U.S. Cl. .............................. 56/12.7; 56/DIG. 15; 56/295; 30/347; 324/71 R
[58] Field of Search ................ 56/12.7, 295, DIG. 15; 30/276, 347; 140/648, 661, 664; 324/158 MG, 71 R

[56] References Cited

U.S. PATENT DOCUMENTS

| | | | |
|---|---|---|---|
| 3,870,954 | 3/1975 | Hanson et al. | 324/158 MG |
| 4,138,810 | 2/1979 | Dittinger et al. | 56/12.7 |
| 4,250,623 | 2/1981 | Dittinger et al. | 56/295 |
| 4,270,200 | 9/1981 | Lombard | 56/12.7 |

Primary Examiner—Robert A. Hafer
Attorney, Agent, or Firm—Karl F. Ross

[57] ABSTRACT

A filament-type vegetation trimmer has an electric motor, a head rotatable by the motor, and a supply of a filament in the head, with the filament extending from the head, whereby on rotation of the head by the motor the extending filament section can cut vegetation. The trimmer further comprises a circuit for detecting the current consumption of the motor and for generating an actual-value output corresponding thereto, an actual-value generator for generating a set-point output corresponding to the current consumption of the motor when the filament is extending from the head by less than a predetermined distance, and a comparator for comparing these outputs and generating a signal when the actual-value output is less than the set-point output.

6 Claims, 1 Drawing Figure

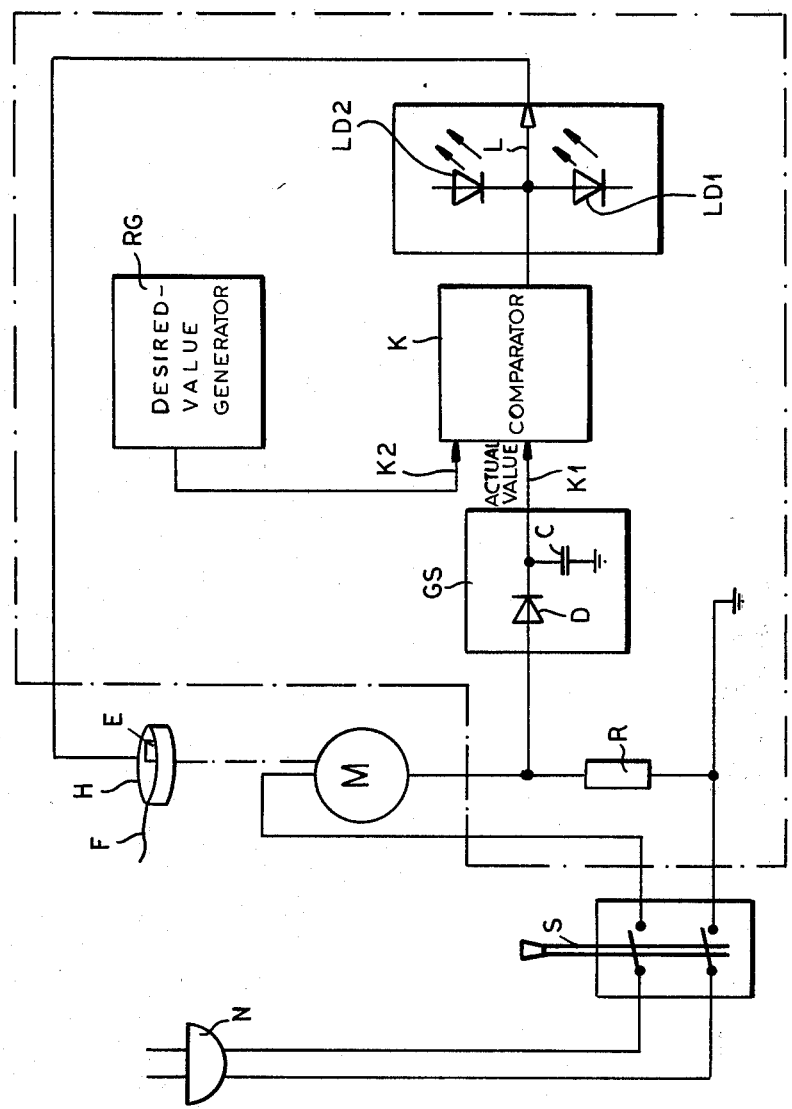

FILAMENT-TYPE VEGETATION TRIMMER WITH AUTOMATIC LINE SENSOR

FIELD OF THE INVENTION

The present invention relates to a filament-type vegetation trimmer. More particularly this invention concerns such a device which is electrically powered.

BACKGROUND OF THE INVENTION

A filament-type vegetation trimmer of the electrically powered type such as described in German utility models Nos. 6,919,841 and 6,938,265 has a long handle from the rear end of which extends the power cord and on the front end of which is mounted an electric motor. A head carried on the output shaft of this motor houses a spool supply of a monofilament line whose end extends out of the head. As the head is rotated at high speed, the whirling line end can cut through light vegetation. Such a trimmer is relatively easy and safe to use, as the line cannot seriously damage either the user or anything substantial adjacent the area being trimmed.

During use the line end periodically breaks off. It therefore becomes necessary for the user to extend a new section of line. This can be done in a standard type of system by bumping the supply-carrying head on the ground to release a section of line from a spool carried in the head. It is also possible on some of the more sophisticated systems to electrically actuate a solenoid clip that releases a section of line.

A problem with such machines is that frequently the end piece of the line breaks off, so that the cutting radius of the machine decreases, without the user noticing it. Only when the efficiency of the device drops off drastically does the user notice and extend a new line section. This necessity of keeping an eye out to constantly check on the condition of the cutting line has been found to be more than a minor inconvenience.

OBJECTS OF THE INVENTION

It is therefore an object of the present invention to provide an improved filament-type vegetation trimmer.

Another object is the provision of such a trimmer which automatically warns the user when the cutting line becomes too short.

SUMMARY OF THE INVENTION

These objects are attained according to the instant invention in a filament-type vegetation trimmer of the above-described general type, that is comprising an electric motor, a head rotatable by the motor, and a supply of a filament in the head, with the filament extending from the head, whereby on rotation of the head by the motor the extending filament section can cut vegetation. The trimmer according to this invention has means for detecting the current consumption of the motor and for generating an actual-value output corresponding thereto, means for generating a set-point output corresponding to the current consumption of the motor when the filament is extending from the head by less than a predetermined distance, and means for comparing these outputs and generating a signal when the actual-value output is less than the set-point output.

The system according to the instant invention is based on the fact that the filament length is approximately proportional to the load on the motor, which in turn is proportional to the motor's current consumption. Hence when the filament shortens below the predetermined minimum length the motor will be relatively unloaded and it will draw relatively little current. While at this short length the current consumption can increase, as when the trimmer is cutting vegetation with a very short filament, but under no circumstances can the current consumption drop below the threshold level unless the filament is short. The longer the filament the greater the current consumption, whether the filament is cutting or whirling unimpeded. The minimum current-consumption level can only be undershot when the filament length is quite short.

According to the instant invention the means for detecting includes a resistor in series with the motor and a diode and filter connected between the resistor and the motor. Such a current detector is sure of having a long service life.

The means for comparing and generating includes an optical indicator and means for operating same when the actual-value output exceeds the set-point output. In such an arrangement therefore the user is optically signaled to perform whatever step is necessary to extend a new piece of line. The indicator according to this invention may be a light-emitting diode, a circuit element known for its ruggedness and long service life. In fact according to this invention red and green light-emitting diodes may be provided that are alternately energized so that when the signal is emitted to indicate to the user to put out a new line section the green light goes out and the red light comes on.

It is also possible according to this invention to provide means in the head for responding to the signal and releasing more of the filament when the signal is generated. Such means may be a simple electromagnetic clip that is spring-loaded into a position holding the line from unreeling, and that can be momentarily electrically energized to release a short section of line. Similarly a ratchet-type brake on the spool of the cutting monofilament may be momentarily electrically energized to release a portion of line.

DESCRIPTION OF THE DRAWING

The above and other features and advantages will become more readily apparent from the following, reference being made to the accompanying drawing whose sole FIGURE is a largely diagrammatic and schematic representation of the instant invention.

SPECIFIC DESCRIPTION

As seen in the drawing a vegetation trimmer has a alternating-current motor M powered through a DPST switch S from a line plug N. This motor M carries a head H from which extends a monofilament line F and which is provided with an electromagnetically operable line clip E.

According to the instant invention the motor M is connected in series with a resistor R. A current detector GS having a diode D and a condenser/filter C is connected across this resistor R and generates an output corresponding to the actual value of current consumption of the motor M. A desired-value generator RG generates a set-point output corresponding to the level the actual-value output would have when the motor current consumption drops below a level indicating that the motor M is relatively unloaded, which can only occur when the filament F is extending only a short distance from the head H.

The actual-value output and the set-point or desired-value output are fed to respective inputs K1 and K2 of a comparator K of standard construction, as for example described in *Pulse, Digital, and Switching Waveforms* by Millman and Taub (Mcgraw-Hill: 1965). This comparator in turn generates an output signal which it feeds on a line L to a pair of light-emitting diodes LD1 and LD2 which are respectively red and green and which are wired up to be alternately energized.

When the actual-value signal on the input K1 exceeds the set-point signal on the input K2, indicating that the motor consumption has dropped below a predetermined threshold level, the red diode LD1 goes on and the green diode LD2 goes out, signalling to the user to take whatever action is necessary to let out more line.

It is also possible to connect the line L to the electromagnetic clip E so as automatically to release more monofilament F each time the comparator K generates its output signal.

The system according to the instant invention therefore eliminates the need for keeping an eye constantly on the filament to check its length, something which is fairly difficult to do under any circumstances in view of the high rotary speed of the filament. Instead either the operator is signaled in an unequivocal manner by the red light to put out more filament F, or this filament F is automatically advanced as needed. The system is so simple, and normally uses wholly solid-state elements, as to be sure to have a long service life.

I claim:

1. A filament-type vegetation trimmer comprising:
   an electric motor;
   a head rotatable by said motor;
   a supply of a filament in said head, with said filament extending from said head, whereby on rotation of said head by said motor the extending filament section can cut vegetation;
   means for detecting the current consumption of said motor and for generating an actual-value output corresponding thereto;
   means for generating a set-point output corresponding to the current consumption of said motor when said filament is extending from said head by less than a predetermined distance; and
   means for comparing said outputs and generating a signal when said actual-value output is less than said set-point output, and means in said head for responding to said signal and releasing more of said filament when said signal is generated.

2. The trimmer defined in claim 1 wherein said means for detecting includes a resistor in series with said motor and a diode and filter connected between said resistor and said motor.

3. The trimmer defined in claim 2 wherein said means for comparing and generating includes a visual indicator and means for operating same when said actual-value output exceeds said set-point output.

4. The trimmer defined in claim 3 wherein said indicator is a light-emitting diode.

5. The trimmer defined in claim 3 whereif said indicator is a pair of alternately energized light-emitting diodes, one of which is red and the other of which is green.

6. The trimmer defined in claim 1 wherein said motor is an alternating-current motor normally powered by line voltage.

* * * * *